(12) United States Patent
Pryor et al.

(10) Patent No.: US 8,683,738 B2
(45) Date of Patent: Apr. 1, 2014

(54) RODENT BAIT STATION

(75) Inventors: Alan E. Pryor, Hartford, WI (US); Timothy D. Jacobs, Schaumburg, IL (US)

(73) Assignee: De Sangosse U.S., Inc., Wilmington, DE (US)

( * ) Notice: Subject to any disclaimer, the term of this patent is extended or adjusted under 35 U.S.C. 154(b) by 149 days.

(21) Appl. No.: 12/823,263

(22) Filed: Jun. 25, 2010

(65) Prior Publication Data
US 2010/0325940 A1 Dec. 30, 2010

Related U.S. Application Data

(60) Provisional application No. 61/220,864, filed on Jun. 26, 2009.

(51) Int. Cl.
*A01M 25/00* (2006.01)

(52) U.S. Cl.
USPC .................................................. 43/131

(58) Field of Classification Search
USPC ............... 43/131; 239/34, 35, 53–55, 57, 60; 392/386, 390
See application file for complete search history.

(56) References Cited

U.S. PATENT DOCUMENTS

| | | | | |
|---|---|---|---|---|
| 1,804,891 A | * | 5/1931 | Newman | 43/131 |
| 2,568,168 A | * | 9/1951 | Query | 43/131 |
| 2,635,382 A | * | 4/1953 | Kuntz | 43/131 |
| 2,651,138 A | * | 9/1953 | Malloy | 43/131 |
| 3,643,371 A | * | 2/1972 | Gordon | 43/131 |
| 3,995,595 A | * | 12/1976 | Williams | 43/131 |
| 4,026,064 A | * | 5/1977 | Baker | 43/131 |
| 4,261,132 A | * | 4/1981 | Carothers et al. | 43/131 |
| 4,453,337 A | * | 6/1984 | Williams | 43/131 |
| 4,541,198 A | * | 9/1985 | Sherman | 43/131 |
| 4,550,525 A | * | 11/1985 | Baker et al. | 43/131 |
| 4,570,377 A | * | 2/1986 | Primavera | 43/131 |
| 4,619,071 A | * | 10/1986 | Willis | 43/131 |
| 4,648,201 A | * | 3/1987 | Sherman | 43/131 |
| 4,730,412 A | * | 3/1988 | Sherman | 43/131 |
| 4,831,775 A | * | 5/1989 | Sherman | 43/131 |
| 4,833,819 A | * | 5/1989 | Sherman | 43/131 |
| 4,849,606 A | * | 7/1989 | Martens et al. | 392/390 |
| 4,857,240 A | * | 8/1989 | Kearnes et al. | 239/60 |
| 5,136,803 A | * | 8/1992 | Sykes et al. | 43/131 |
| 5,272,832 A | * | 12/1993 | Marshall et al. | 43/131 |
| 5,394,506 A | * | 2/1995 | Stein et al. | 392/390 |
| 5,448,852 A | * | 9/1995 | Spragins et al. | 43/131 |
| 5,628,143 A | * | 5/1997 | Doucette | 43/131 |
| 5,806,237 A | * | 9/1998 | Nelson et al. | 43/131 |
| 5,857,286 A | * | 1/1999 | Doucette | 43/131 |
| 5,901,496 A | * | 5/1999 | Woodruff | 43/131 |
| 5,966,863 A | * | 10/1999 | Payton et al. | 43/131 |

(Continued)

FOREIGN PATENT DOCUMENTS

| | | | | |
|---|---|---|---|---|
| EP | 1201124 A2 | * | 5/2002 | A01M 25/00 |
| JP | 2001136888 A | * | 5/2001 | A01M 1/20 |

(Continued)

*Primary Examiner* — Darren W Ark
(74) *Attorney, Agent, or Firm* — Reinhart Boerner Van Deuren s.c.

(57) ABSTRACT

A refillable bait station for pest control includes a housing, a bait receptacle operable for insertion into said housing, and a releasable latching mechanism associated with said housing and operable for releasably securing said bait receptacle within said housing.

20 Claims, 13 Drawing Sheets

(56) References Cited

U.S. PATENT DOCUMENTS

| | | | |
|---|---|---|---|
| 6,014,834 A * | 1/2000 | Ferland | 43/131 |
| 6,041,542 A * | 3/2000 | Payton et al. | 43/131 |
| 6,078,728 A * | 6/2000 | O'Rourke et al. | 392/390 |
| 6,272,791 B1 * | 8/2001 | Pleasants | 43/131 |
| 6,374,044 B1 * | 4/2002 | Freidel | 392/390 |
| 6,397,517 B1 * | 6/2002 | Leyerle et al. | 43/131 |
| 6,401,384 B1 * | 6/2002 | Contadini et al. | 43/131 |
| 6,470,622 B1 * | 10/2002 | Braun | 43/131 |
| 6,474,015 B1 * | 11/2002 | Lund et al. | 43/131 |
| 6,651,378 B2 * | 11/2003 | Baker | 43/131 |
| 6,655,079 B1 * | 12/2003 | Bernard et al. | 43/131 |
| 6,671,999 B1 * | 1/2004 | Doucette | 43/131 |
| 6,729,067 B2 * | 5/2004 | Lund et al. | 43/131 |
| 6,874,274 B2 * | 4/2005 | Townsend | 43/131 |
| 6,990,769 B2 * | 1/2006 | Wright | 43/131 |
| 7,204,054 B2 * | 4/2007 | Mayo et al. | 43/131 |
| 7,377,072 B2 * | 5/2008 | Meier et al. | 43/131 |
| 7,434,351 B2 * | 10/2008 | Bette | 43/131 |
| 7,647,723 B2 * | 1/2010 | Klein et al. | 43/131 |
| 7,670,566 B2 * | 3/2010 | Adair et al. | 392/390 |
| 7,874,098 B2 * | 1/2011 | Vickery et al. | 43/131 |
| 7,980,023 B2 * | 7/2011 | Nelson et al. | 43/131 |
| 7,987,629 B2 * | 8/2011 | Harper | 43/131 |
| 8,028,468 B1 * | 10/2011 | Walsh et al. | 43/131 |
| 8,209,900 B2 * | 7/2012 | Vickery et al. | 43/131 |
| 8,266,839 B2 * | 9/2012 | Bernard | 43/131 |
| 8,302,345 B2 * | 11/2012 | Nelson et al. | 43/131 |
| 8,578,649 B1 * | 11/2013 | Walsh et al. | 43/131 |
| 2004/0181996 A1 * | 9/2004 | Johnson et al. | 43/131 |
| 2004/0190883 A1 * | 9/2004 | Kompara et al. | 392/390 |
| 2004/0244274 A1 * | 12/2004 | Dellevigne et al. | 43/131 |
| 2008/0072475 A1 * | 3/2008 | Nelson et al. | 43/131 |
| 2009/0229170 A1 * | 9/2009 | Gaibotti | 43/131 |
| 2009/0307963 A1 * | 12/2009 | Abbas | 43/131 |
| 2010/0205850 A1 * | 8/2010 | Bernard | 43/131 |
| 2011/0258907 A1 * | 10/2011 | Endepols et al. | 43/131 |
| 2012/0124891 A1 * | 5/2012 | Jovic et al. | 43/131 |

FOREIGN PATENT DOCUMENTS

| | | | | |
|---|---|---|---|---|
| JP | 2002209499 A | * | 7/2002 | A01M 1/20 |
| JP | 2002320437 A | * | 11/2002 | A01M 1/20 |
| JP | 2003225041 A | * | 8/2003 | A01M 1/20 |
| JP | 2005058207 A | * | 3/2005 | A01M 1/20 |
| JP | 2007117086 A | * | 5/2007 | A01M 1/20 |
| JP | 2008068098 A | * | 3/2008 | A01M 1/20 |
| JP | 2008178336 A | * | 8/2008 | A01M 1/20 |
| JP | 2011142825 A | * | 7/2011 | A01M 1/20 |
| WO | WO 9966791 A1 | * | 12/1999 | A01M 1/20 |
| WO | WO 2005043998 A1 | * | 5/2005 | A01M 1/20 |
| WO | WO 2006067741 A2 | * | 6/2006 | A01M 1/20 |
| WO | WO 2007147550 A1 | * | 12/2007 | A01M 25/00 |
| WO | WO 2010149990 A2 | * | 12/2010 | A01M 25/00 |
| WO | WO 2010149991 A2 | * | 12/2010 | A01M 25/00 |

* cited by examiner

RODENT BAIT STATION

CROSS-REFERENCE TO RELATED APPLICATIONS

This patent application claims priority of U.S. Provisional Patent Application No. 61/220,864 entitled "Rodent Bait Station," and which was filed on Jun. 26, 2009, the entirety of which patent application is hereby incorporated herein by reference.

BACKGROUND OF THE INVENTION

Field of the Invention

This invention relates generally to the field of pest control products and, more particularly, to a reusable rodent bait station.

In the past, rodent bait stations were often single use disposable objects. Thus, once the bait in the bait station was ingested by rodents, the entire bait station would need to be disposed of. The bait station itself was not expended, only the bait contained therein, however bait stations had no way to be refilled.

Subsequently, bait stations were produced that could be opened and refilled with bait. Since it is undesirable to allow children or pets to open the bait stations and gain access to the active ingredient bait contained therein, such bait stations typically require a key to open the bait station to allow it to be refilled. This presents an issue should the key becomes lost or broken, and either another key must be obtained or the entire bait station must be disposed of.

Additionally, since bait stations are molded from colored plastic material (which is typically black), it is impossible to determine when the bait station needs to be refilled without opening the cover, or to determine when it contains either dead or live rodents (other than by picking it up and detecting additional weight or movement inside).

Further, when refilling a bait station, typically a user must handle all parts of the bait station, including the bait to be placed inside as well as the portion of the bait station in which the bait is placed. This is undesirable, particularly since rodents carrying disease may have touched the same parts which must be handled by the user. Additionally, the bait often contains powerful active ingredients that could be harmful to users should the ingredients not be removed from the users' hands.

Still further, rodents generally tend to follow paths close to a wall rather than paths that extend away from the wall. Existing bait stations are configured with an opening or openings that are located at an intermediate location on the side or sides thereof. Thus, even when such bait stations are located against a wall, the opening or openings are not located near the wall.

Therefore, it would be desirable to provide a bait station that is reusable and refillable with bait without requiring the user to touch the bait or parts of the bait station that have come into contact with the bait.

It would further be desirable to provide a bait station that may be opened without a key, but that is difficult or impossible to be opened by a child or a pet.

Further, it would be desirable to provide a bait station that allows a user to determine both when a rodent is present in the bait station and when the bait station needs to be refilled with bait without opening the bait station.

Additionally, it would be desirable to provide a bait station that allows a user to open and refill the bait station without coming into contact with various parts of the bait station or the bait containing an active ingredient.

Still further, it would be desirable to provide a bait station that has openings that are located close adjacent a wall that the bait station is placed next to.

SUMMARY OF THE INVENTION

One aspect of the invention generally pertains to an improved control device for rodents that may be readily refilled with bait.

Another aspect of the invention pertains to an improved rodent control device that may be refilled without the user having to directly touch the base.

Yet another aspect of the invention pertains to an improved rodent control device that secures bait within the trap without requiring a key or other additional device to access the bait storage mechanism, while still being difficult for a child to open.

An additional aspect of the invention pertains to an improved rodent control device that allows a user to determine both when a rodent is in the station and when the bait station needs to be refilled.

In accordance with the above aspects of the invention, there is provided a refillable bait station for pest control that includes a housing; a bait receptacle operable for insertion into said housing; and a releasable latching mechanism associated with said housing and operable for releasably securing said bait receptacle within said housing.

Additionally, in accordance with the present teachings, there is provided a reusable bait station for pest control that includes a housing having at least one pest access opening therein; a bait receptacle access opening; at least one internal channel; a latching mechanism; and a latch release mechanism; and a bait receptacle having means for retaining a desired amount of bait; at least one flange operable for engaging said internal channel upon insertion of said bait receptacle into said housing through said bait receptacle access opening; and at least one displaceable tab operable for releasable engagement with said latching mechanism.

An embodiment of the present invention provides a reusable bait station for pest control including a housing. The housing includes at least one pest access opening, a bait receptacle access opening, at least one internal channel, a latching mechanism, and a latch release mechanism. The reusable bait station also includes a bait receptacle, which includes a bait retaining portion configured to retain an amount of bait, at least one flange operable for engaging the internal channel when the bait receptacle is inserted through the bait receptacle access opening, and at least one displaceable tab operable for releasable engagement with the latching mechanism.

In another aspect a reusable rodent bait station is provided. Such a reusable rodent bait station comprises a housing including at least one exterior opening and a receptacle opening. Such a housing may include a top portion coupled to a bottom portion, with the top portion defining a latch and at least one release button. Such a reusable rodent bait station may also comprise a receptacle defining a bait pocket, the receptacle including at least one flange and the receptacle configured to be received by the housing into the receptacle opening. Such a flange may be configured to interact with the latch when the receptacle is arranged within the receptacle opening to selectively secure the receptacle in the housing. Such a release button may be configured to selectively release the flange from interaction with the latch allowing for sliding displacement of the receptacle relative to the housing.

In another aspect, a refillable bait station for pest control may comprise a housing, a bait receptacle operable for insertion into the housing, a releasable latching mechanism associated with the housing and operable for selectively releasably securing the bait receptacle within the housing.

In another aspect, a method of pest control is provided. Such a method comprises the steps of providing a housing, providing a bait receptacle, slidingly inserting the bait receptacle into the housing thereby releasably latching the bait receptacle within the housing, monitoring the bait receptacle to determine a point at which the bait receptacle should be refilled with bait, activating a release portion of the housing to release the bait receptacle from the housing, refilling the bait receptacle with bait, and slidingly inserting the bait receptacle into the housing, thereby releasably latching said bait receptacle within said housing.

These aspects are merely illustrative of the many advantageous aspects associated with the present invention and should not be deemed as limiting in any manner. These and other aspects, features, and advantages of the present invention will become apparent from the following detailed description when taken in conjunction with the referenced drawings.

DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE EXEMPLARY EMBODIMENTS

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

FIGS. 1 through 11 illustrate a first embodiment of an improved, reusable bait station 10 for rodents. The bait station 10 is advantageously refillable and, therefore, reusable by the purchaser. This has the benefit of reducing waste by eliminating the need to dispose of the bait station when its bait is expended. Instead, the station 10 can be refilled with bait and placed back into active use. While the bait station 10 is suitable for use with rodent baits in all forms, it is particularly well adapted for use with paste or solid baits.

The bait station 10 includes two primary parts: a housing 100 and a refillable bait receptacle 200. The refillable bait receptacle 200 is insertable into the housing 100 and automatically locks therein, in a manner described in more detail below, to prevent the bait, which typically contains poisons that, while not necessarily fatal, have the capacity to make both humans and pets ill, from being readily accessed by either children or household animals except for the target rodents. While the receptacle 200 automatically locks into the housing 100, it can be readily removed from the housing 100 by actuating a mechanism that is relatively simple for adults yet quite difficult for children to manage.

Figure 2:
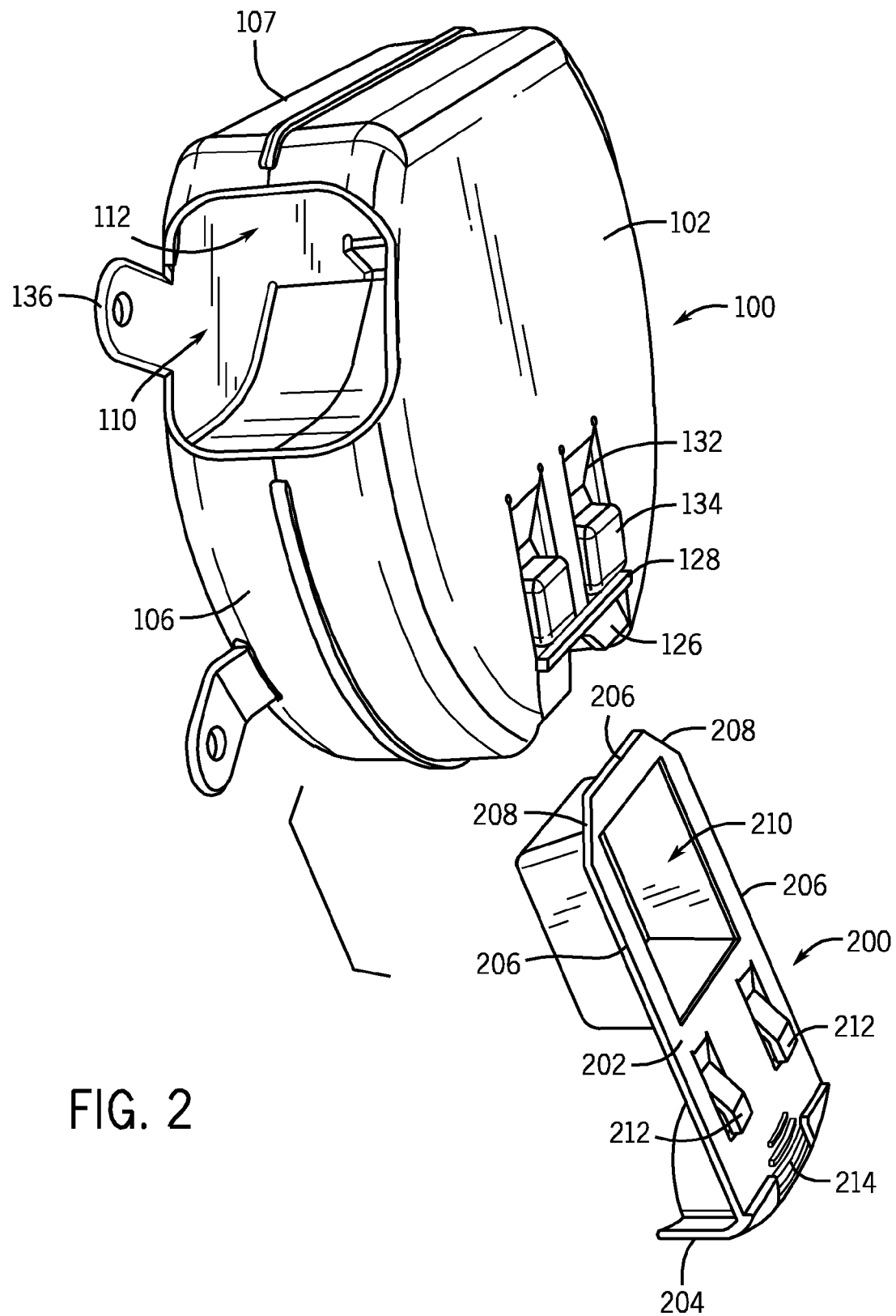
FIG. 2 is an isometric view of the bait station of FIG. 1 with its bait receptacle removed from the housing.

With reference to FIG. 2, the receptacle 200 includes a main body 202 that is preferably formed in one piece. The receptacle 200 may be injection molded of a plastic, but those of skill in the art will recognize that numerous materials and methods may used to form the receptacle 200. The main body 202 has a external skirt 204 that coordinates with the housing 100 to form a consistent exterior surface when the receptacle 200 is inserted into the housing 100. Flanges 206 extend around the main body 202 on three sides. The flanges 206 on the sides of the main body 202 are used to help guide the receptacle 200 into the desired position and orientation within the housing 100. Two angled edges 208 are present at the front corners of the main body flanges. These angled edges 208 render the leading edge of the receptacle 200 slightly narrower than the remainder of the receptacle 200 and the corresponding opening in the housing 100, thereby making it easier to center and slide the receptacle 200 into position.

A pocket 210 extends downwardly from the main body 202 and is arranged to receive the bait for the station 10. The pocket 210 is advantageously positioned at the front end of the receptacle 200 to properly position the bait relative to rodent passages running through the housing 100, which will be described further below.

The receptacle 200 utilizes two displaceable tabs 212 adjacent the rear end of the receptacle 200. The tabs 212 are integrally formed from the main body 202 in a preferred embodiment. The tabs 212 are attached to the main body 202 at one end and are free at their opposing end, which is preferably the end closest to the rear of the receptacle 200.

The tabs 212 perform similar in action to a leaf spring and are displaceable downwardly under an exerted force and spring back to a neutral, more raised position when such force is removed. In the neutral, raised position, the free end of the tabs 212 rests slightly higher than the surrounding surface of the main body 202. This feature allows the tabs 212 to interact with corresponding features in the housing 100 in order to provide the automatic locking function referenced herein.

Finally, the receptacle 200 includes a series of raised, finger grip ridges 214 at the rear end of the top surface of the main body 202. These ridges 214 assist a user in gripping and removing the receptacle 200 from the housing 100 for refilling.

Figure 1:
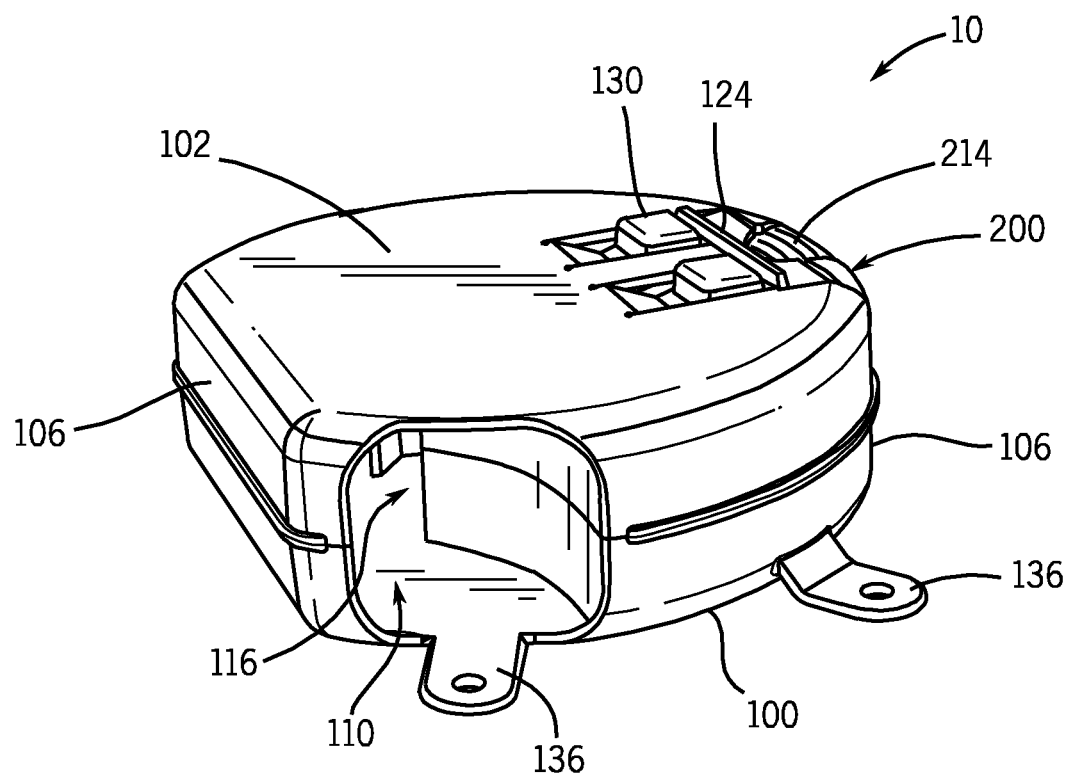
FIG. 1 is an isometric view of a bait station according to a first embodiment of the present invention.

The housing 100 of the embodiment illustrated in FIGS. 1 and 2 is roughly semi-circular in shape, although many other configurations are possible, as will be further described below. In one embodiment, the semi-circular shaped housing also includes a substantially flat side 107. This substantially flat side 107 allows the housing 100 to be placed by a user against a wall or other flat surface, resulting in a compact configuration.

The housing 100 includes a top 102, bottom 104 (illustrated in FIG. 3), and side walls 106. As those of skill in the art will note, the embodiment of the housing 100 illustrated in the accompanying drawings is molded in two separate halves—an upper portion and a lower portion—which are joined together after molding. While this process is helpful in the molding process, the scope of the invention does not exclude a unitary housing.

Figure 6:
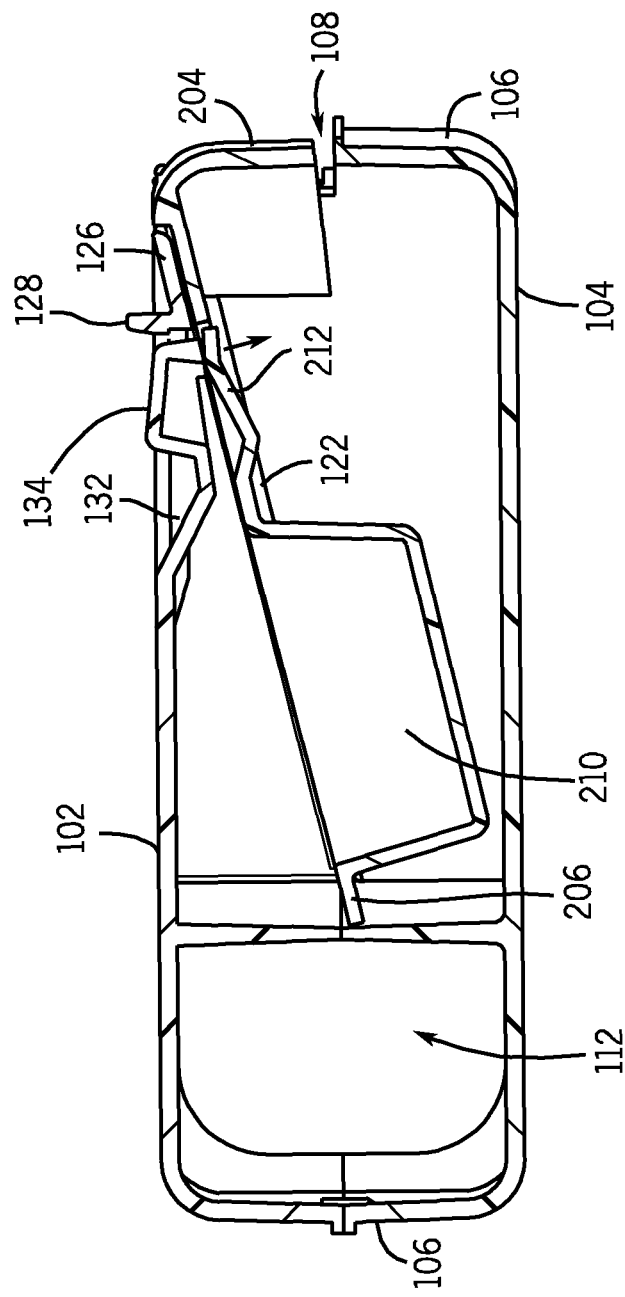
FIG. 6 is a cross-sectional view of the bait station of FIG. 1 with the receptacle inserted into the housing.
Figure 7:
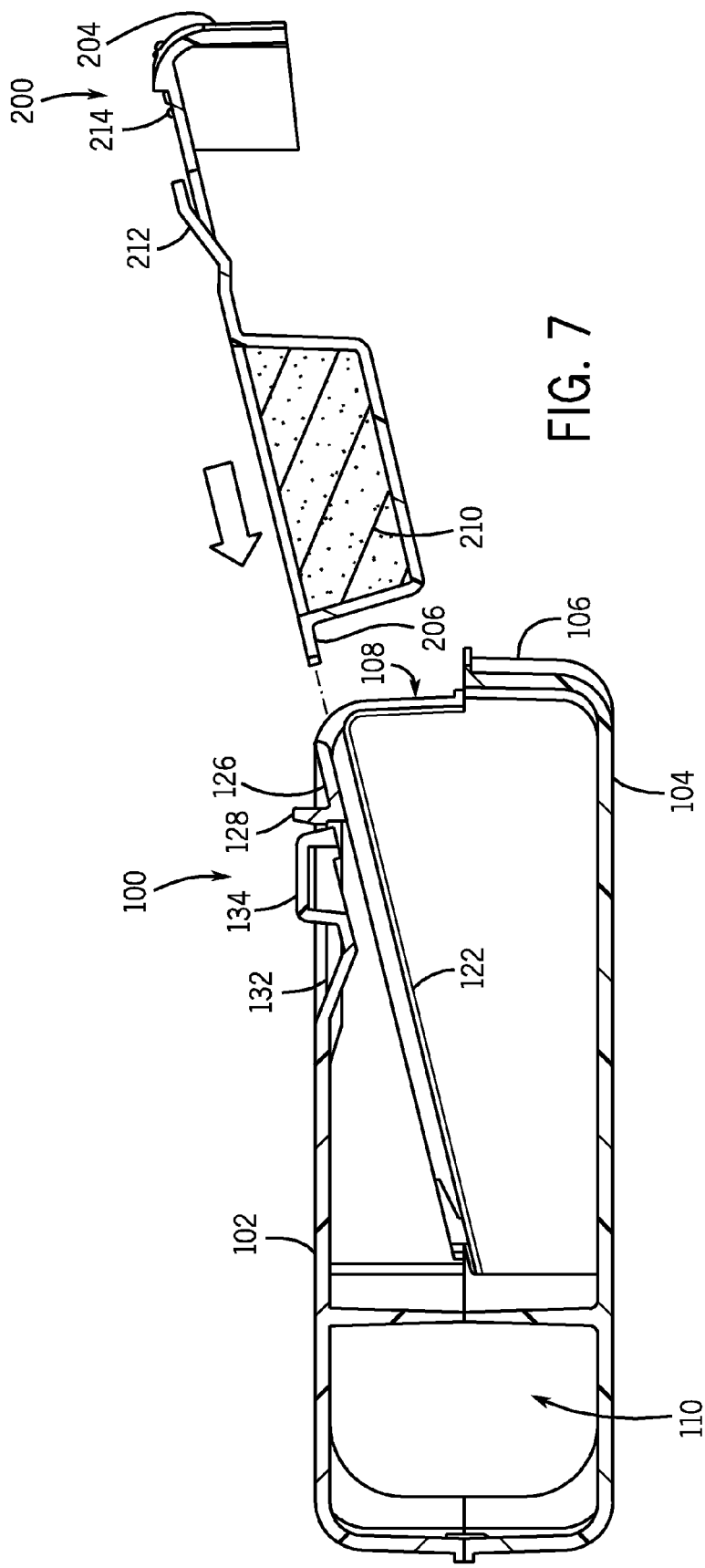
FIG. 7 is a cross-sectional view of the bait station of FIG. 1 with the receptacle being inserted.

The housing 100 defines a receptacle opening 108, illustrated in FIGS. 6 and 7, in the side wall 106. The receptacle opening 108 allows insertion of the bait receptacle 200 into the interior of the housing 100. In the preferred embodiment, there is a partial side wall 106 that continues below the receptacle opening 108. When the bait receptacle 200 is fully inserted through the receptacle opening 108, the external skirt 204 largely closes the receptacle opening 108 and, in combination with the partial side wall 106 below the receptacle opening 108, presents a generally uniform exterior appearance.

Figure 3:
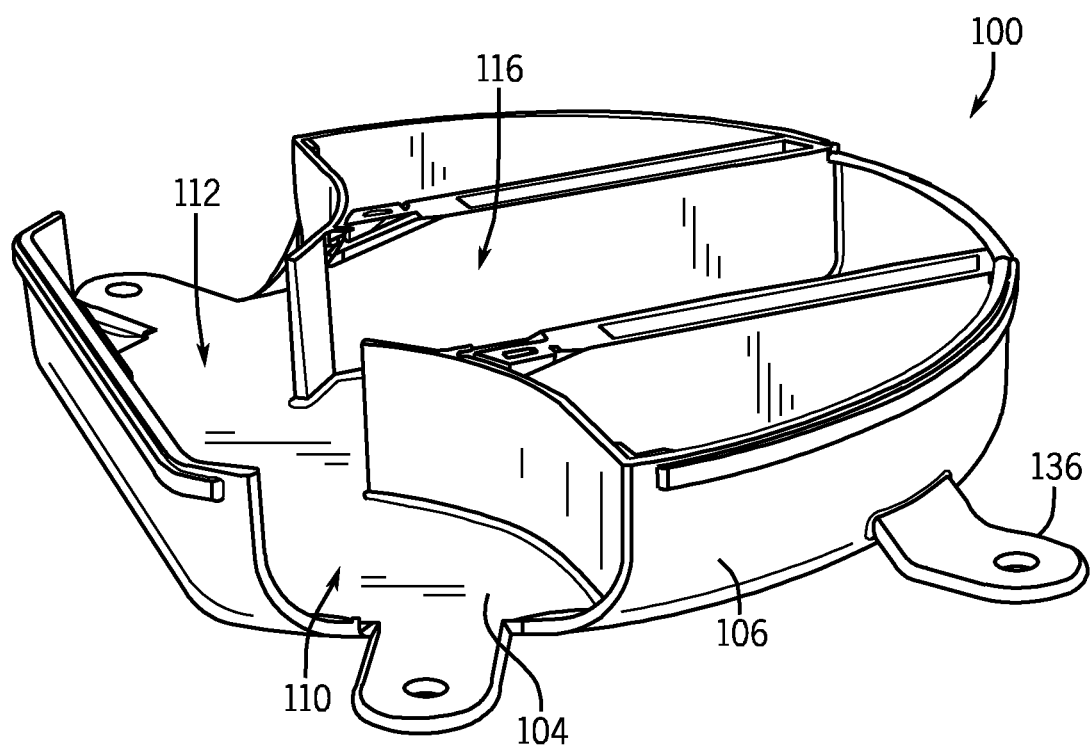
FIG. 3 is a cross-sectional view of the bait station of FIG. 1 focusing on the lower portion of the housing.
Figure 4:
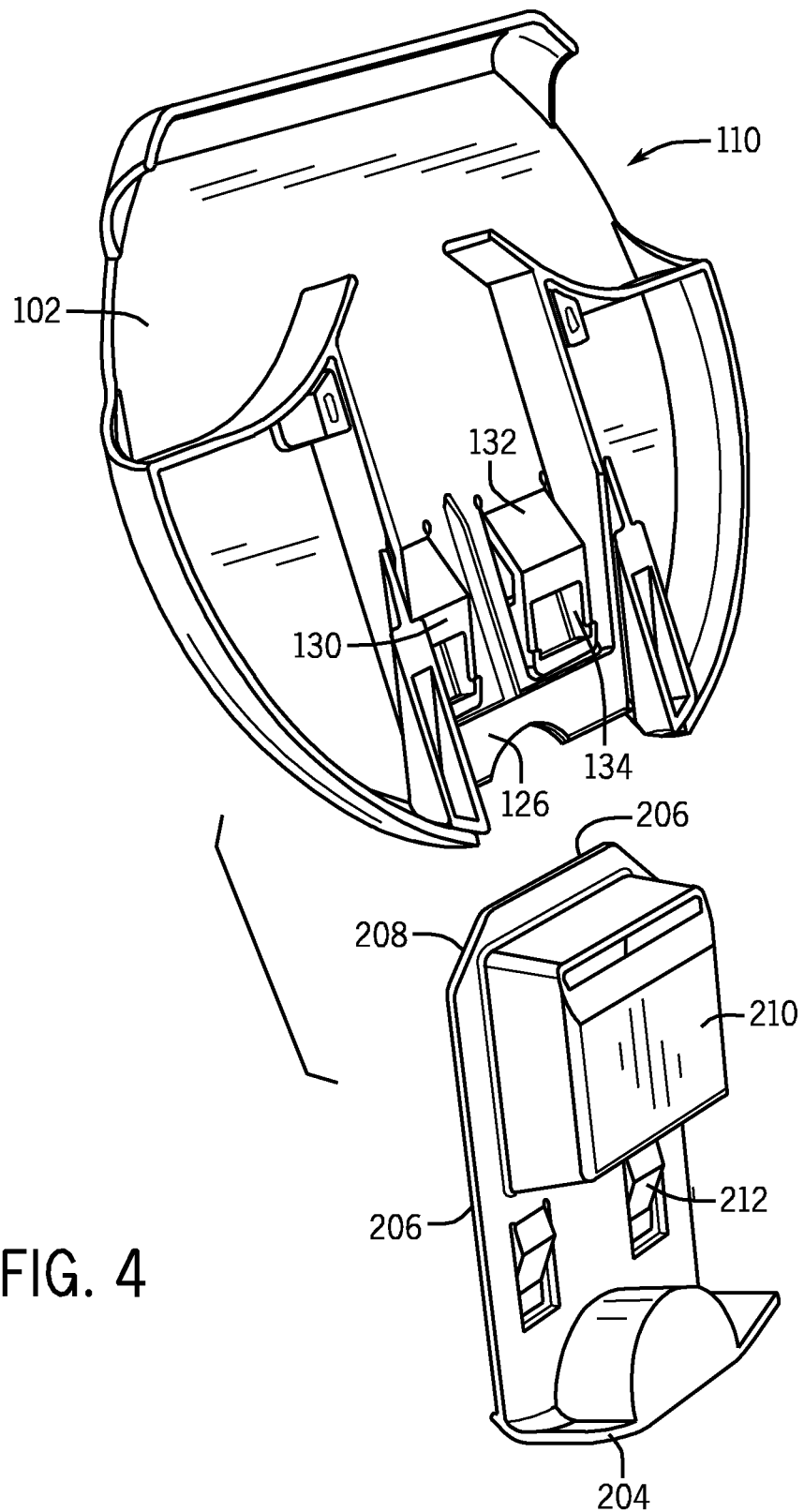
FIG. 4 is a partial cross-sectional exploded view showing the underside of the top of the housing and the underside of the receptacle of the bait station of FIG. 1.
Figure 5:
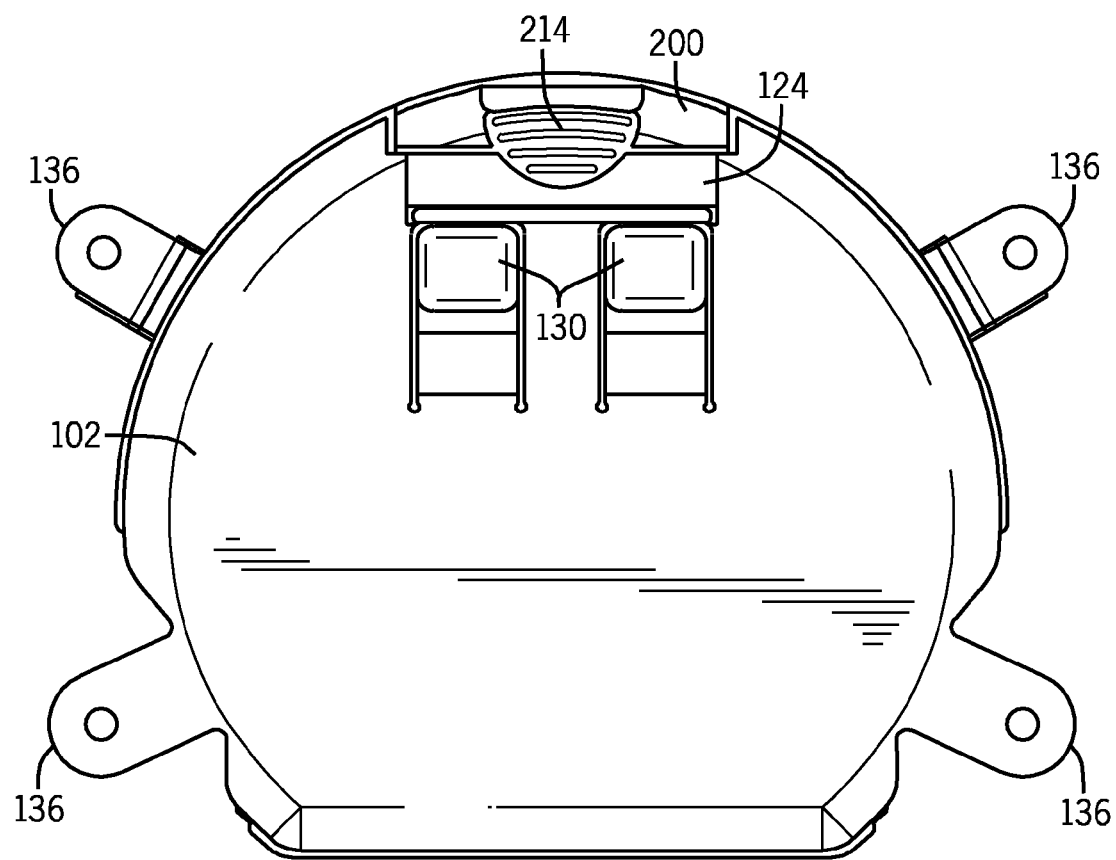
FIG. 5 is a top view of the bait station of FIG. 1 showing the bait receptacle inserted into the housing.

The receptacle opening 108 leads to a bait access passage 116, illustrated in FIG. 3 which extends from the receptacle opening 108 towards the opposite side wall 106 of the housing 100. The bait access passage 116 provides the internal space necessary to accommodate the bait receptacle 200.

With reference to FIG. 6, two angled guides or channels 122 run along the sides of the bait access passage 116. These angled channels 122 have open sides that face each other and support the side flanges 206 (illustrated in FIG. 2) of the bait receptacle 200 as it is inserted into the housing 100. The angled nature of the channels 122 positions the bait receptacle 200 at a matching angle, which presents the leading edge of the bait receptacle 200 at a lower orientation than the remainder of the bait receptacle 200. This position ensures that rodents will be able to reach over the front edge of the bait receptacle 200 to access the bait within the bait pocket 210.

With reference to FIGS. 1 through 3, the housing 100 includes at least one, and in the preferred embodiment two, exterior openings 110 in the side walls 106. In the illustrated embodiment, these exterior openings 110 are arranged approximately opposite one another. In this arrangement, a lateral interior passageway 112 extends through the housing 100 between the exterior openings 110. Advantageously, the lateral interior passageway 112 intersects the bait access passage 116 within the interior of the housing 100. In the illustrated embodiment, this arrangement results in essentially a T-shaped interior in the housing 100. This allows rodents to readily access the bait in the receptacle pocket 210 by first entering the interior of the housing 100 through one of the exterior openings 110, traveling down the lateral interior passageway 112 to the bait access passage 116, and, finally, down the bait access passage 116 to the bait receptacle 200. After taking the bait, the rodent can then exit the housing 100 through the same or a different exterior opening 110.

Figure 8:
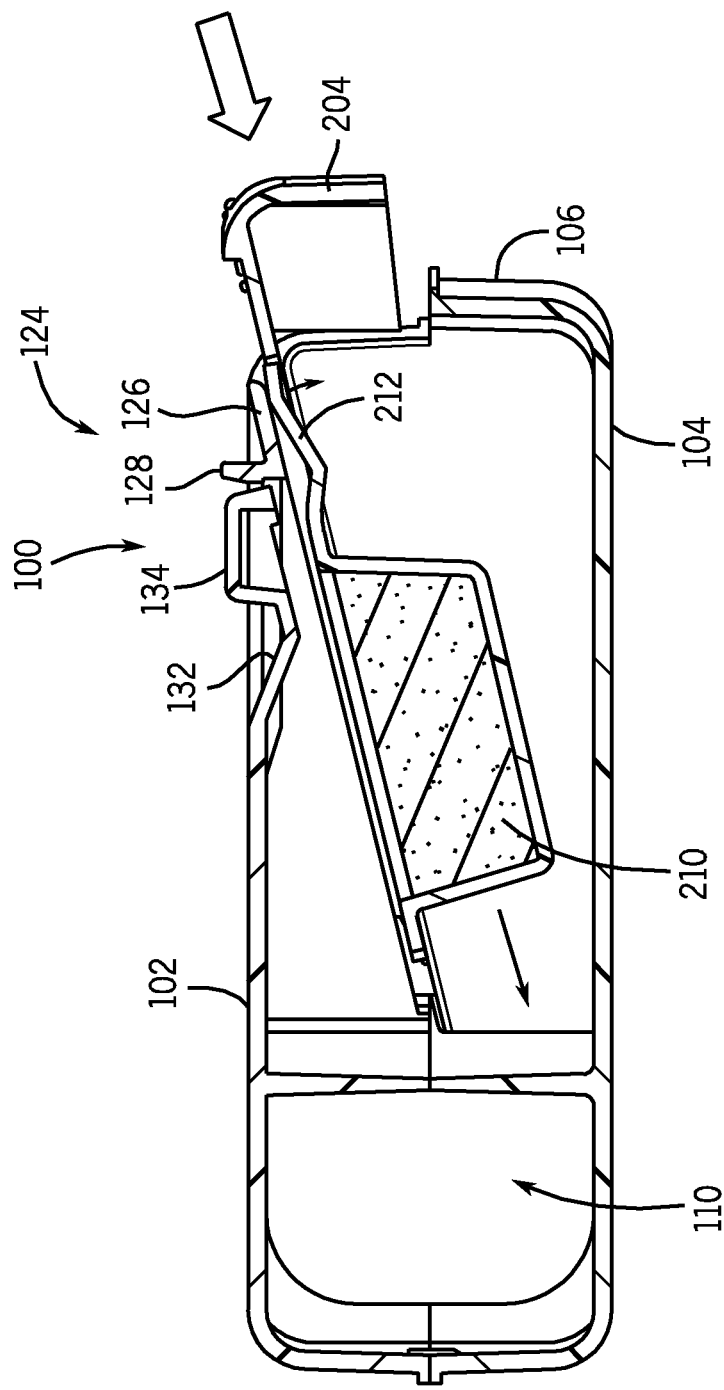
FIG. 8 is a cross-sectional view of the bait station of FIG. 1 illustrating the movement of various portions of the receptacle as it is inserted into the housing.
Figure 9:
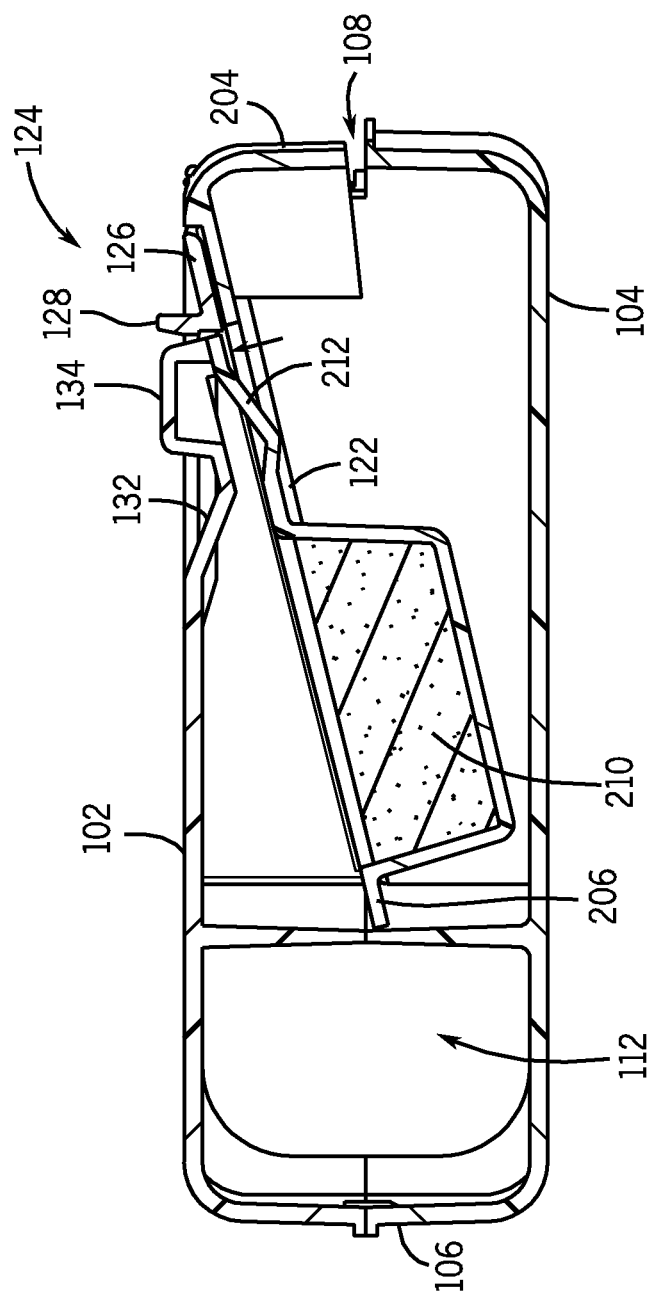
FIG. 9 is a cross-sectional view of the bait station of FIG. 1 illustrating the movement of a portion of the receptacle as it is secured within the housing.

With reference to FIGS. 1, 8, and 9, the housing 100 of the first embodiment further includes a latch 124 in the top surface 102 adjacent the receptacle opening 108. The latch 124 consists of a downwardly angled member 126 that extends slightly below the top surface 102 of the housing 100. Advantageously, the angle of the member 126 roughly approximates the angle of channels 122 and, thus, the angle of insertion of the bait receptacle 200. A vertical member 128 extends upwardly from the low end of the downwardly angled member 126.

With reference to FIGS. 7 through 9, as the bait receptacle 200 is inserted into the housing 100, the top surface of the bait receptacle 200 freely passes the latch 124. As the displaceable tabs 212 of the bait receptacle 200 pass under the latch 124, which preferably extends across both such tabs 212, the tabs 212 are displaced downwardly and the latch 124 slightly upwardly, thereby allowing the tabs 212 to also pass the latch 124.

However, once the tabs 212 completely pass the latch, they rebound upwardly to their natural, slightly raised position as the latch 124 returns to its lowered position. With the pieces in this arrangement, the free, raised ends of the displaceable tabs 212 encounter the vertical member 128 of the latch 124, thereby preventing substantial movement of the bait receptacle 200 out of the housing 100. This mechanism makes removal of the bait receptacle 200 from the housing 100 more difficult for children and household pets to reduce the chances of accidental poisonings.

Figure 10:
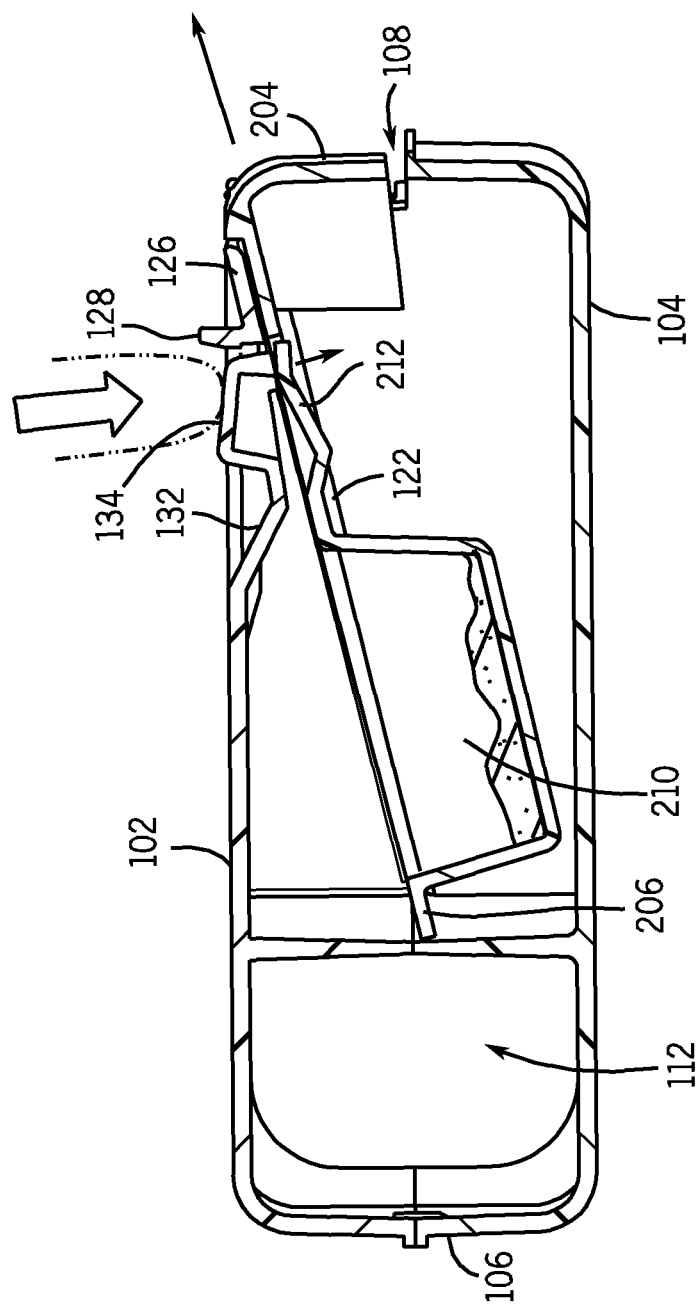
FIG. 10 is a cross-sectional view of the bait station of FIG. 1 illustrating the process for releasing the receptacle from the bait station.
Figure 11:
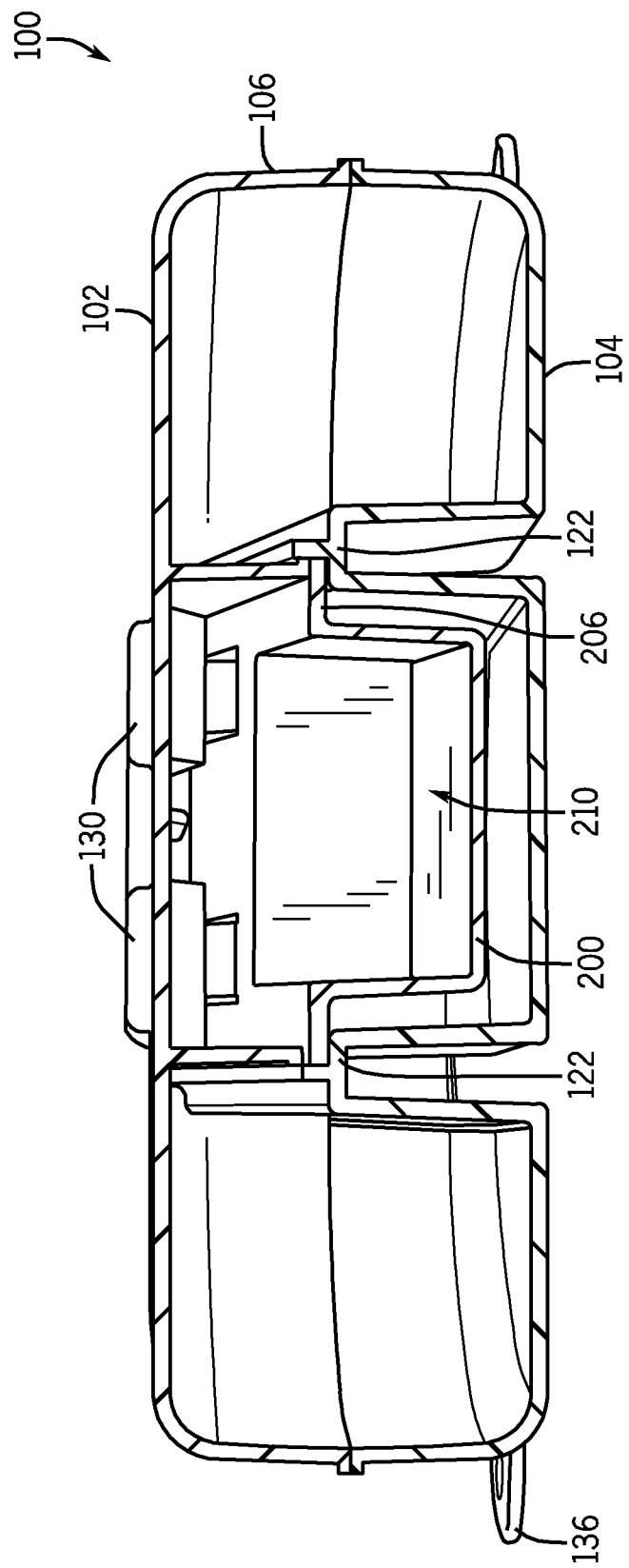
FIG. 11 is a cross-sectional view of the bait station of FIG. 1 focusing on the rear portion of the housing and the bait receptacle.

With reference to FIGS. 10 and 11, the latching mechanism described above may be overcome by again downwardly displacing the tabs 212 so that the free ends thereof are able to pass beneath the latch 124. Release buttons 130 are provided in the top surface 102 of the housing 100 for this purpose. The number of release buttons 130 corresponds to the number of displaceable tabs 212. In a preferred embodiment more than one release button 130 and displaceable tab 212 are utilized. The use of multiple release buttons 130 and tabs 212 requires the coordinated use of multiple fingers, which is typically beyond the physical capabilities of young children.

With reference to FIG. 10, the release buttons 130 include a cantilever arm 132 and a button element 134 connected thereto. The cantilever arm 132 is connected at one end with the top surface 102 of the housing 100 in a pivoting manner. The other end of the cantilever arm 132 is free. The button element 134 is connected to the free end of the cantilever arm 132. The button element 134 is positioned such that it lies immediately above the free end of the corresponding displaceable tab 212 on the bait receptacle 200. Exerting pressure on the button element 134 in a direction substantially perpendicular to the top surface 102 forces the cantilever arm 132 to flex and at least a portion of the button element 134 into the interior of the housing 100. When the bait receptacle 200 is within the housing 100, this downward motion of the release button 130 causes the button element 134 to engage and urge the corresponding tab 212 downwardly so that it can freely pass underneath the latch 124 when a user provides an additional simultaneous pulling force (substantially parallel with angled channels 122), thereby allowing the bait receptacle 200 to be removed from the housing for refilling.

In one embodiment, two buttons 130 are provided. Each of these buttons 130 must be depressed simultaneously to clear a pair of tabs 212 downwardly so that each can freely pass underneath the latch 124. Additionally, while the buttons 130 are being depressed simultaneously, requiring a significant amount of coordination with a single hand, in one embodiment a user must use a second hand to simultaneously slidingly pull the receptacle 200 free away from the housing 100. This requires still further coordination likely not possessed by small children or pets. Therefore, this embodiment of the present invention includes a receptacle 200 that is selectively releasable from the housing 100 without the use of a key (or any other device that a user must keep track of). However, small children and pets are prevented from separating the receptacle 200 from the housing 100.

The housing 100 may also include multiple feet 136 that help stabilize the station 10, as illustrated in FIG. 1.

Figure 12:
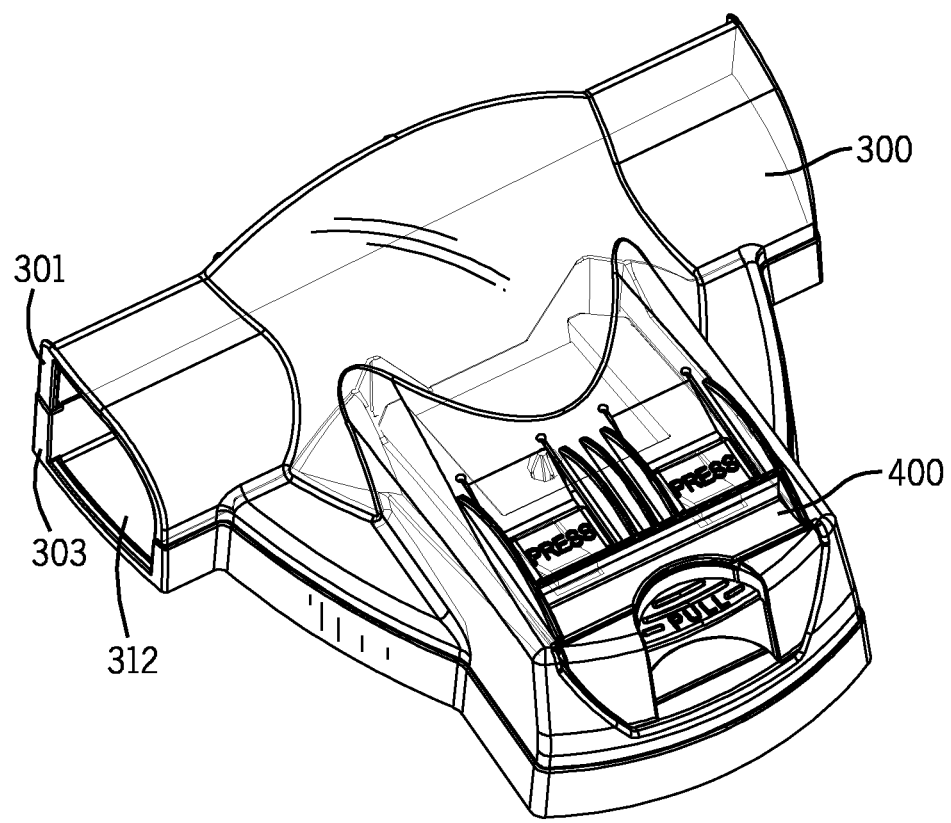
FIG. 12 is an isometric view of a second embodiment of a bait station of the present invention with the receptacle inserted into the housing.
Figure 13:
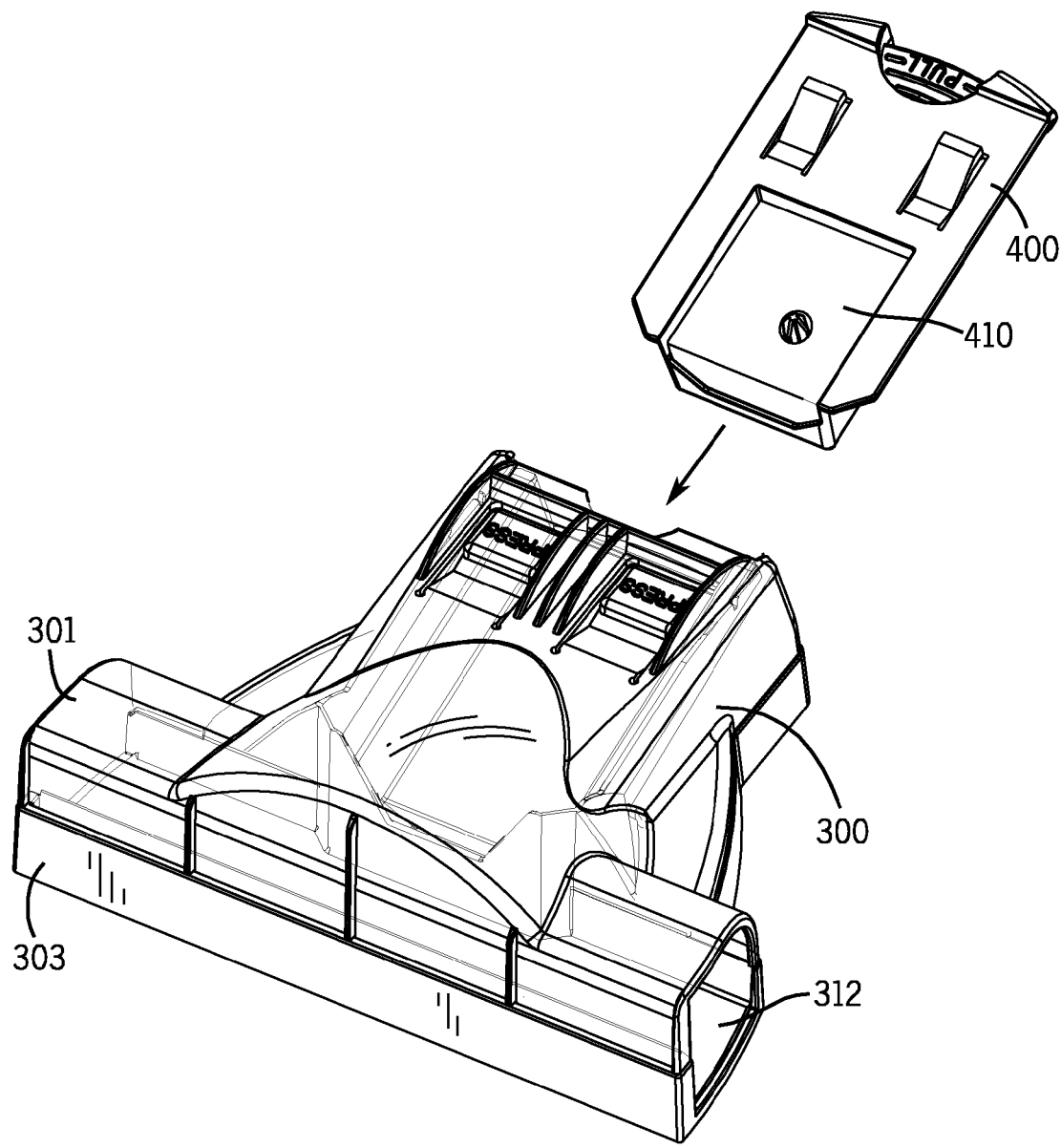
FIG. 13 is an isometric view of the second embodiment of the bait station of FIG. 12 with the receptacle removed from the housing.

FIGS. 12 and 13 illustrate a second embodiment of the present invention. This embodiment is of a construction similar to the first embodiment including a housing 300 and a refillable bait receptacle 400. The second embodiment differs from the first embodiment in that the housing 300, instead of defining a semi-circular shape, as in the first embodiment, substantially defines a "T" shape surrounding the lateral interior passageway 312 and the bait access passage (not illustrated). The "T" shape includes a flat side of the housing 300 which again allows a user to arrange and configure the housing 300 against or close proximate to a wall or other flat surface, resulting in a compact arrangement of the housing 300 within a room.

As illustrated in FIG. 13, the refillable bait receptacle 400 is still similarly received into and removed from the housing 300. The housing 300 of the second embodiment is divided into a top portion 301 and a bottom portion 303. At least a portion of the top portion 301 is transparent or translucent in one embodiment, allowing a user to see into the housing 300 to determine whether any animal is within the housing 300, as well as to determine the amount of bait remaining in the pocket 410, and whether the pocket 410 needs to be refilled.

For purposes of this disclosure, the term "coupled" means the mechanical joining of two components directly or indirectly to one another. Such joining may be stationary in nature or moveable in nature. Such joining may be achieved with the two components and any additional intermediate members being integrally formed as a single unitary body with one another or the two components and any additional member being attached to one another. Such joining may be permanent in nature or alternatively be removable or releasable in nature.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A reusable bait station comprising:
a bait station housing including at least one external opening and a bait receptacle access opening, said bait station housing having a top member coupled to a bottom member, said top member defining at least one latch member and at least one latch release button; and
a bait receptacle defining a bait pocket, said bait receptacle including an engagement member for releasable engagement with said at least one latch member, said bait receptacle being configured to be received by said bait station housing through said bait receptacle access opening;
wherein said bait station housing defines a bait access passage extending from said bait receptacle access opening configured to receive said bait receptacle;
wherein said bait access passage includes a pair of angled channels;
wherein said bait receptacle includes a pair of side flanges;
wherein said engagement member is configured to interact with said at least one latch member when said bait receptacle is inserted into the bait station housing through said bait receptacle access opening to releasably secure said bait receptacle within said bait station housing; and
wherein said at least one latch release button is configured to be actuated by a user to displace the engagement member relative to the at least one latch member to release said engagement member from engagement with said at least one latch member to allow said bait receptacle to be removed from said bait station housing.

2. The reusable bait station of claim 1, wherein at least a portion of said top member is one of transparent and translucent;
wherein a user may view rodents and bait within at least one of said bait station housing and said bait receptacle.

3. The reusable bait station of claim 1, wherein the bait station housing defines a pest access passage extending from the at least one external opening, the bait station housing defining a generally T shape surrounding the pest access passage and the bait access passage.

4. The reusable bait station of claim 1, wherein said bait access passage is accessible by way of said at least one external opening in said bait station housing.

5. The reusable bait station of claim 1, wherein said side flanges are supported in said angled channels by a pair of angled supports when said bait receptacle is inserted into said bait station housing.

6. The reusable bait station of claim 5, wherein said angled channels are angled downwardly with respect to said top member of said bait station housing, and wherein said bait receptacle extends from a first end to a second end opposite the first end, the bait pocket being located proximate the first end, the bait pocket being configured such that its contents are accessible through an open top of the bait pocket;
wherein the bait station housing includes a top wall and a bottom wall; and
wherein the bait receptacle is supported at a downward angle within said bait station housing with the first end of the bait receptacle located closer to the bottom wall of the bait station housing than the second end of the bait receptacle.

7. The reusable bait station of claim 1, wherein said bait station housing comprises a flat side and wherein said at least one external opening is located adjacent said flat side.

8. The reusable bait station of claim 1, wherein said bait receptacle is removable from said bait station housing without the use of a key.

9. The reusable bait station of claim 1, wherein the at least one latch release button is configured such that when it is actuated it causes the engagement member to disengage from the at least one latch member allowing the bait receptacle to be removed from the bait station housing.

10. The reusable bait station of claim 1, wherein the bait station defines in its interior a passage extending between the at least one external opening and the bait receptacle access opening; and
  wherein bait retained by the bait receptacle is located in the passage when the bait receptacle is inserted into the bait station housing.

11. A reusable bait station for pest control, comprising:
  a bait station housing having an exterior surface with a top wall, a bottom wall, and a sidewall extending between the top wall and the bottom wall and a side for placement against a wall, said bait station housing comprising:
    a first pest access opening extending through the sidewall of said bait station housing providing access for pests to pass through from outside of the bait station housing to an interior of the bait station housing;
    a bait receptacle access opening defined in the exterior surface of said bait station housing;
    a first latch member of said bait station housing; and
    the top wall including a first latch release mechanism;
  a bait receptacle, wherein said bait receptacle and said bait station housing are respectively arranged and configured to allow said bait receptacle to be removably inserted into and removed from said bait station housing through said bait receptacle access opening defined in the exterior surface of said bait station housing, said bait receptacle comprising:
    a bait retaining element configured to retain an amount of bait;
    a first displaceable tab configured to engage said first latch member to retain said bait receptacle in said bait station housing, said first displaceable tab being configured for engagement by said first latch release mechanism such that when said first latch release mechanism is actuated, said first displaceable tab will be disengaged from said first latch member to allow said bait receptacle to be removed from said bait station housing; and
  a gripping element located on said bait receptacle at a location that is accessible when said bait receptacle is installed in said bait station housing;
  wherein the first pest access opening is configured to provide access to bait retained by the bait retaining element.

12. The reusable bait station of claim 11, wherein said bait station housing comprises:
  a transparent or translucent portion configured to allow a user to view the amount of bait retained by said bait receptacle and/or the interior of said bait station housing to determine whether a pest is located therein.

13. The reusable bait station of claim 11, wherein said bait station housing additionally comprises:
  a second latch member located in said bait station housing; and
  a second latch release mechanism located in said bait station housing; and
  wherein said bait receptacle additionally comprises:
    a second displaceable tab configured to engage said second latch member to retain said bait receptacle in said bait station housing, said second displaceable tab being configured for engagement by said second latch release mechanism, said second displaceable tab being engageable by said second latch release mechanism to disengage said second displaceable tab from said second latch member;
  wherein when said first and second displaceable tabs are respectively actuated by said first and second latch release mechanisms, said first and second displaceable tabs will be respectively disengaged from said first and second latch members to allow said bait receptacle to be removed from said bait station housing.

14. The reusable bait station of claim 13, wherein said first and second latch release mechanisms are arranged and configured on said bait station housing with respect to said gripping element located on said bait receptacle such that when said bait receptacle is located in said bait station housing, said first and second latch release mechanisms and said gripping element cannot be engaged with a single hand of a user to remove said bait receptacle from said bait station housing.

15. The reusable bait station of claim 11, wherein said bait station housing additionally comprises:
  a second pest access opening located in an other side of said bait station housing both adjacent said side of said bait station housing for placement against a wall and opposite said first pest access opening.

16. The reusable bait station of claim 15, wherein bait in said bait receptacle is accessible by way of said first and second pest access openings.

17. The reusable bait station of claim 15, wherein said first and second pest access openings are connected by a lateral interior passageway, said lateral interior passageway being coupled with a bait access passageway defined in said bait station housing perpendicular to said lateral interior passageway which provides access to bait located in said bait receptacle.

18. The reusable bait station of claim 11, wherein said bait station housing and said bait receptacle are formed from injection molded plastic.

19. The reusable bait station of claim 11, additionally comprising:
  a plurality of outwardly extending feet coupled to said bait station housing at a bottom side thereof and arranged and configured to stabilize said bait station housing.

20. The reusable bait station of claim 11, wherein said bait station housing additionally comprises:
  a pair of spaced-apart angled channels located within said bait station housing; and
  wherein said bait receptacle additionally comprises:
    a pair of flanges located on opposite sides of said bait receptacle;
  wherein said pair of flanges on said bait receptacle respectively are received into said pair of channels within said bait station housing to facilitate insertion of said bait receptacle into said bait station housing through said bait receptacle access opening.

* * * * *